US009449171B2

(12) United States Patent
Davis (10) Patent No.: US 9,449,171 B2
(45) Date of Patent: Sep. 20, 2016

(54) METHODS, SYSTEMS, AND COMPUTER READABLE MEDIUMS FOR PROVIDING SUPPLY CHAIN VALIDATION

(71) Applicant: VCE Company, LLC, Richardson, TX (US)

(72) Inventor: Christopher Michael Davis, Frisco, TX (US)

(73) Assignee: VCE Company, LLC, Richardson, TX (US)

( * ) Notice: Subject to any disclaimer, the term of this patent is extended or adjusted under 35 U.S.C. 154(b) by 0 days.

(21) Appl. No.: 14/285,022

(22) Filed: May 22, 2014

(65) Prior Publication Data

US 2015/0339476 A1 Nov. 26, 2015

(51) Int. Cl.
*G06F 21/50* (2013.01)
*G06F 21/55* (2013.01)
*G06F 21/57* (2013.01)
*H04L 29/06* (2006.01)

(52) U.S. Cl.
CPC ............. *G06F 21/552* (2013.01); *G06F 21/57* (2013.01); *H04L 63/0876* (2013.01); *G06F 2221/034* (2013.01)

(58) Field of Classification Search
CPC ........ G06F 21/28; G06F 21/70; G06F 21/00; G06F 21/552
See application file for complete search history.

(56) References Cited

U.S. PATENT DOCUMENTS

| | | |
|---|---|---|
| 2010/0064048 A1 | 3/2010 | Hoggan |
| 2013/0067236 A1 | 3/2013 | Russo et al. |
| 2013/0124840 A1 | 5/2013 | Diluoffo et al. |
| 2013/0125204 A1* | 5/2013 | La Fever et al. ................. 726/2 |
| 2013/0198838 A1 | 8/2013 | Schmidt et al. |
| 2014/0095286 A1 | 4/2014 | Drewry et al. |

OTHER PUBLICATIONS

Notification of Transmittal of the International Search Report and the Written Opinion of the International Searching Authority, or the Declaration for International Application No. PCT/US2015/021193 (Jun. 12, 2015).

\* cited by examiner

*Primary Examiner* — Izunna Okeke
(74) *Attorney, Agent, or Firm* — Jenkins, Wilson, Taylor & Hunt, P.A.

(57) ABSTRACT

Methods, systems, and computer readable mediums for providing supply chain validation are disclosed. According to one exemplary embodiment, a method for validating a computing system comprises receiving, from a source entity and via an out of band delivery, validation information for validating the computing system, wherein the validation information is derived from one or more components of the computing system. The method also includes determining, using the validation information and reference information associated with the computing system, whether a configuration of the computing system has been modified and, in response to determining that the configuration of the computing system has been modified, generating information about a system modification.

15 Claims, 5 Drawing Sheets

METHODS, SYSTEMS, AND COMPUTER READABLE MEDIUMS FOR PROVIDING SUPPLY CHAIN VALIDATION

TECHNICAL FIELD

The subject matter described herein relates to validation techniques. More specifically, the subject matter relates to methods, systems, and computer readable mediums for providing supply chain validation.

BACKGROUND

Supply chain security has become a growing subject of interest for many individuals, governments, organizations, and businesses. In particular, many security concerns are raised when using people and organizations outside your own control to deliver goods or services because a trusted chain of custody is extremely difficult to verify. For example, recent news articles have discussed an espionage and surveillance technique called "interdiction," where goods, such as computers and/or other electronics, shipped from a manufacturer are intercepted in route to a customer, modified, e.g., to include surveillance hardware and/or malicious software, and then delivered to the unsuspected customer. Since a customer may believe delivered goods or services to be from a trusted source (e.g., the manufacturer), the customer may use the goods or services without validating the goods and/or without discovering unwanted and/or malicious modifications.

SUMMARY

Methods, systems, and computer readable mediums for providing supply chain validation are disclosed. According to one exemplary embodiment, a method for validating a computing system comprises receiving, from a source entity and via an out of band delivery, validation information for validating the computing system, wherein the validation information is derived from one or more components of the computing system. The method also includes determining, using the validation information and reference information associated with the computing system, whether a configuration of the computing system has been modified and, in response to determining that the configuration of the computing system has been modified, generating information about a system modification.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable mediums for providing supply chain validation. For example, supply chain validation may include methods and/or techniques for independently validating that a computing system has been received unmodified or uncompromised. In this example, the computing system to be validated may include one or more computing platforms comprising one or more computing system components (CSCs), such as compute components, software components, network components, switching components, storage components, hardware components, firmware components, and/or other elements. In some embodiments, an exemplary computing system for providing and/or performing supply chain validation may include a converged infrastructure system (CIS), such as, for example, a Vblock™ System from VCE Company, LLC. A CIS can comprise multiple CSCs (e.g., components, physical resources and/or virtual resources) in a preconfigured or prepackaged computing platform, where some CSCs are developed and/or manufactured by multiple entities. For example, an exemplary CIS can comprise data storage devices, servers, networking equipment, and software for managing physical resources and/or virtualized resources (e.g., virtual servers).

In accordance with some aspects of the disclosed subject matter, validation information associated with a computing system can be provided to a recipient via an out of band delivery (e.g., a delivery that occurs separately and/or at a different time from the delivery of the computing system). Exemplary validation information may include any information usable for validating a system or portions therein, such as state information, hardware measurements, firmware measurements, software measurements, configuration measurements (e.g., settings or parameter values associated with hardware, firmware, and/or software) and/or fingerprints (e.g., hash values, signatures, and/or identifiers) usable for validating a system or portions therein. For example, validation information may include known or expected state information associated with a computing system as determined by a source entity prior to delivery of the computing system to a recipient. In this example, the validation information may be used to validate that the computing system and/or portions therein (e.g., CSCs or groups of CSCs) has not been modified during delivery.

In accordance with some aspects of the disclosed subject matter, reference information associated with a computing system can be generated and used for validation purposes. Reference information may include any information usable for validating a system or portions therein. Exemplary reference information may include state information, hardware measurements, firmware measurements, software measurements, configuration measurements and/or fingerprints usable for validating a system or portions therein. For example, reference information may include current state information associated with a computing system, such as when the computing system is received by a recipient.

In accordance with some aspects of the disclosed subject matter, reference information and validation information can be based on or generated using similar, if not identical, information. In some embodiments, reference information and validation information may be distinguishable based on when the respective information is generated and/or by whom. For example, validation information may be generated and provided from a manufacturer to a customer, while reference information may be generated by the customer typically at reception or when performing validation. In this example, supply chain validation may include identifying if a computing system has been modified or tampered with by comparing the provided validation information and the reference information. If no differences are found between the validation information and the reference information, the computing system and supply chain may be considered validated.

In accordance with some aspects of the disclosed subject matter, fingerprints may be generated and/or used for validation purposes (e.g., validation information and/or reference information). Exemplary fingerprints may include a hash value, a signature, compressed data, and/or other identifiers for identifying or validating a computing system and/or one or more portion(s) therein. In some embodiments, fingerprints may be uniform in size (e.g., bit length) or format (e.g., a standardized character set). In some embodiments, fingerprints may have various sizes or formats. For example, measurements associated with CSCs may be used to generate 64-bit fingerprints. In this example, the 64-bit fingerprints along with other fingerprints and/or measurements associated with a computing system may be used to generate a 2048-bit system fingerprint. In some embodiments, fingerprint generation can be type-dependent and/or modular such that various CSCs, groups of CSCs, and/or computing systems (e.g., as a whole) can be uniquely identified using fingerprints. For example, CSCs in a computing system can be uniquely identifiable in the context of the hardware, firmware, software, and specific configurations. However, information or measurements needed to identify or validate one CSC or group of CSCs may be different than information or measurements needed to identify or validate another CSC or group of CSCs. By generating fingerprints that are modular, a computing system and any CSCs or groups of CSCs therein can be uniquely identified and validated.

In accordance with some aspects of the disclosed subject matter, various advantages can be readily appreciated over conventional methods that rely on visual inspection. Exemplary advantageous aspects associated with some aspects of the present disclosure can include: automating the validation process or a substantial portion, thereby increasing consistency and allowing repeatability; providing validation information out of band from the delivery of a computing system such that the validation information is less likely to be compromised even if the computer system is compromised; utilizing modular fingerprints such that validation can efficiently utilize measurements involving hundreds or thousands of data point; providing information about detected system modifications with expanding granularity and detail; and performing validation using validation information provided by a source entity as another measurement for system assurance.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
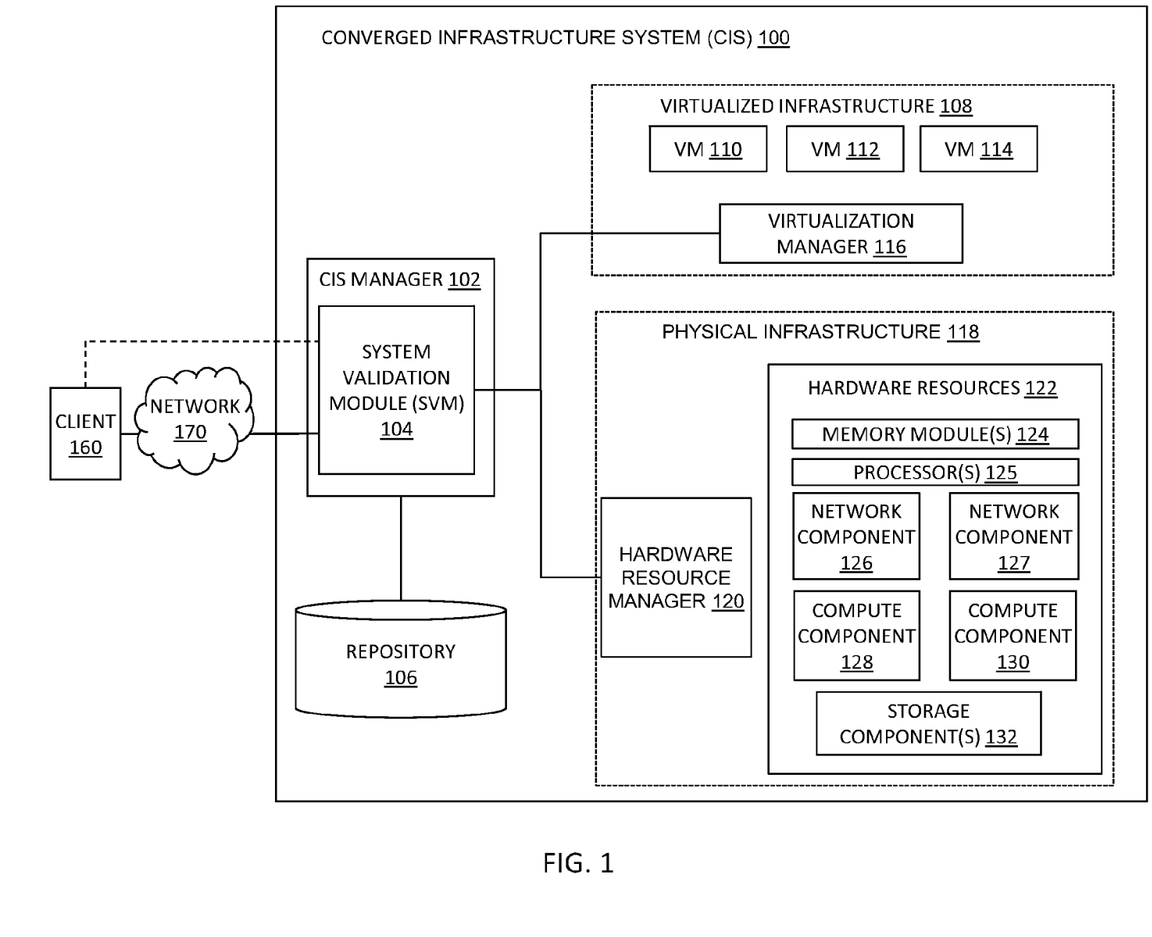
FIG. 1 is a diagram illustrating an exemplary converged infrastructure system according to an embodiment of the subject matter described herein.

FIG. 1 is a block diagram illustrating exemplary CIS 100 according to an embodiment of the subject matter described herein. CIS 100 can comprise CSCs, such as virtual resources and physical resources. Exemplary physical resources can comprise a processor, a memory module, a compute component, a network component, a storage component, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CISs), a virtual machine, a virtual server, a virtual storage device, a virtual port, and/or a virtual communications interface. CIS 100 may also comprise software and related components for managing the CIS and/or portions (e.g., CSCs) therein.

In some embodiments, CIS 100 may be configured to provide data center functionality, cloud service functionality, and/or other functionality. CIS 100 may be capable of communicating with other CISs (e.g., located at various physical locations or sites) and may communicate with various other entities, such as network nodes (e.g., servers hosting online sites) and users. For example, client 160 may represent any entity (e.g., software executing on a processor, a web-based interface, etc.) for allowing a user (e.g., a human operator or an automated system) to interact with CIS 100, CSCs therein, and/or other entities. In some embodiments, client 160 may establish communication directly with CIS 100 without using network 170.

In some embodiments, CIS 100 can comprise a CIS manager 102 (e.g., a CIS management module), a repository 106, virtualized infrastructure 108, and/or physical infrastructure 118. CIS manager 102 may be any suitable entity for managing aspects of CIS 100 or portions therein (e.g., CSCs or groups of CSCs). CIS manager 102 may be configured to communicate with various CSCs and/or for managing various CSCs. For example, CIS manager 102 can be configured to access each CSC within CIS 100 and return relevant information to client 160. For example, CIS manager 102 may be configured to manage performance, resource utilization levels, and other aspects associated with virtualized infrastructure 108 and/or physical infrastructure 118. In some embodiments, CIS manager 102 can comprise VCE Vision™ Intelligent Operations software and/or firmware.

CIS manager 102 can comprise or interact with a system validation module (SVM) 104. SVM 104 can be any suitable entity (e.g., software executing on a processor) for performing one or more aspects associated with providing or performing supply chain validation, system validation, group validation, and/or element (e.g., component) validation. For example, SVM 104 may be configured to perform functionality associated with a reference monitor (e.g., a hardware and software implementation of a security kernel responsible for authenticating and validating various system state measurements and/or other information).

In some embodiments, SVM 104 can be configured to receive and use validation information provided by a source entity to determine whether a computing system, such as CIS 100, or a portion therein (e.g., compute component 128 or 130) has been modified or compromised. In some embodiments, SVM 104 can be configured to generate reference information associated with a computing system (e.g., at customer's reception of the computing system) and can validate or attempt to validate the generated reference information using provided validation information. In some embodiments, SVM 104 can be configured to provide information about validation results, including information about detected modifications, e.g., to client 160 via a user interface.

In some embodiments, SVM 104 can include one or more communications interfaces for communicating with various entities, such as client 160, other CISs, and/or one or more CSCs. Exemplary communications interfaces may receive or send messages associated with various protocols or formats. For example, validation information from manufacturer may be stored in an encrypted extensible markup language (XML) file. In this example, SVM 104 may be configured to decrypt, read, and/or otherwise use the validation information from the manufacturer. Exemplary communications interfaces may also include user interfaces for interacting with CIS 100 or portions therein. Exemplary user interfaces may support automation (e.g., via one or more scripting languages), a representation state transfer (REST) application programming interface (API), a command line interface (CLI), and/or a web-based graphical user interface (GUI).

In some embodiments, SVM 104 can include functionality for receiving, obtaining, and/or generating validation information and/or reference information (e.g., measurements or fingerprints about various aspects of CIS 100). For example, SVM 104 may analyze state information associated with hardware, software, and/or firmware in CIS 100 and/or a CSC therein (e.g., compute component 128) to obtain reference information that may uniquely identify CIS 100 and/or the CSC. In this example, the reference information may include configuration information, along with serial numbers or globally unique identifiers (GUIDs) associated with hardware, software, and firmware of the CIS 100 or a CSC(s) therein.

In some embodiments, SVM 104 can include functionality for generating fingerprints or other identifiers for identifying CIS 100 or portions therein (e.g., CSCs or groups of CSCs). For example, SVM 104 may analyze and/or gather measurements, including serial numbers, version numbers, configuration information, and/or other information, about a CSC. In this example, SVM 104 may provide the measurements as input to a hashing algorithm (e.g., a hash function or a message digest function), a compression algorithm, or other logic to generate a fingerprint for uniquely identifying the CSC.

In some embodiments, fingerprint generation may be modular and input information may be determined using one or more factors. Exemplary factors for fingerprint generation may include customer preferences, preconfigured information (e.g., a list of predefined measurements to gather for different types of CSCs), dynamic information (e.g., information based on current or on-going measurements), historical information, and/or other information. For example, client 160 or a source entity can identify minimum measurements to use in generating various fingerprints, such as a central processing unit (CPU) identifier for a hardware fingerprint, a firmware code version number for a firmware fingerprint, and a sampling of configurations from one or more security hardening guides for a software fingerprint. In another example, client 160 or a source entity may identify different measurements to use when generating modular fingerprints for various CSCs.

In some embodiments, fingerprints may be advantageous because of uniformity (e.g., similar length or character sets), size (e.g., a fingerprint may be smaller in storage size than a concatenation of related measurements), obscurity (e.g., a fingerprint may obscure sensitive state information), and/or modularity (e.g., a fingerprint can be generated using various information). For example, fingerprints may compress or condense hundreds or even thousands of data points into relatively small data portions, such as 32-bit or 64-bit data portions. In another example, multiple CSCs related fingerprints may be used to generate an aggregate, system fingerprint.

In some embodiments, SVM 104 can include functionality for analyzing validation information and/or reference information for validation purposes. For example, SVM 104 may compare validation information and reference information associated with a computing system (e.g., CIS 100). In this example, the validation information may include a system fingerprint based on the computing system prior to the computing system leaving the manufacturer and the reference information may include a system fingerprint based on the computing system at the time of reception by client 160. If the validation information and the reference information are identical or vary within an acceptable range, SVM 104 may determine that the computing system has not been modified and that the supply chain for supplying the computing system is validated. However, if the validation information and the reference information are different or vary outside an acceptable range, SVM 104 may determine that the computing system has been modified and that the supply chain for supplying the computing system is compromised.

In some embodiments, SVM 104 can include functionality for providing information about system modifications. For example, SVM 104 may include a user interface for displaying differences detected between validation information and reference information. In this example, the user interface may allow a user to determine additional information about a system modification via "drill down" user interface (UI) elements. Additional information can be based on a variety of sources and may include numerous types of information, including description of a modification, possible identities of the modifying entity, and mitigation actions to revert or mitigate the modification.

In some embodiments, SVM 104 can include functionality for storing validation information and/or reference information (e.g., measurements and/or fingerprints for CIS 100 or CSCs therein) in repository 106. Repository 106 can include any data storage unit (e.g., a database, storage component(s) 132, or a plurality of databases) that may be configured to store validation information and/or reference information, such as hardware measurements, software measurements, firmware measurements, and/or fingerprints. Although FIG. 1 depicts repository 106 as a local data storage unit residing on CIS 100, repository 106 can also be embodied as a data storage unit located at an online location (e.g., a public distributed content site), on a local proxy server in a customer's or system administrator's environment, or on a different CIS without departing from the scope of the disclosed subject matter. Further, repository 106 may be implemented using one or more computing platforms, devices, or systems.

In some embodiments, repository 106 can be provisioned with validation information and/or reference information from a second repository (e.g., from another CIS or from an online location, such as a known, online site that may be hosted by the CIS manufacturer). For example, various information may be obtained or copied from a second repository (e.g., a second CIS, an online site, online repository, or any other online location) over network 170, using secure copy (SCP) protocol, file transfer protocol (FTP), secure file transfer protocol (SFTP), hypertext transfer protocol (HTTP), or any like protocol. In some embodiments, CIS 100 and a second CIS may be located at a common site and can be communicatively connected by a wired connection. In such a configuration, repository 106 may be provisioned with validation information from the second CIS via the wired connection. It is understood that the provisioning of repository 106 with various information with the exemplary methods described above may be conducted via any automated or automatic manner. In addition, information copied from a second repository and installed into repository 106 may utilize any form of transportable mediums, such as a compact disc (CD), flash memory, a universal serial bus (USB) device, and the like.

Virtualized infrastructure 108 can comprise a virtualization environment configured to simulate components of a computing device, e.g., a processor, system memory, and a storage device, for executing one or more virtual machines (VMs) (e.g., VM 110, VM 112, and VM 114). Each of VM 110, VM 112, and VM 114 may be configured to perform various functions and/or services, such as web server functions or cloud application services, and may interact with various nodes, components, and/or users.

In some embodiments, virtualized infrastructure 108 can be associated with one or more virtual entities. Each virtual entity can comprise one or more CIS or portions therein, e.g., CSCs from one or more CISs. In some embodiments, virtualization manager 116 may allow logical entities to be created, deleted, or modified using an API and/or a GUI. Virtualization manager 116 may be any suitable entity (e.g., software executing in a virtual machine) for managing aspects associated with virtualized infrastructure 108. In some embodiments, virtualization manager 116 may be configured to provide data center management through one or more communications interfaces. For example, virtualization manager 116 may communicate with one or more third-party management tools using APIs.

Physical infrastructure 118 can comprise hardware resources 122, such as memory module(s) 124, processor(s) 125, network components 126-127, compute components 128-130, and one or more storage component(s) 132. Hardware resources 122 may be communicatively connected to various other CSCs in CIS 100 and other entities. Hardware resources 122 can be configured for use by one or more virtual entities. In some embodiments, network components 126-127 (e.g., network switches) may be configured to enable communication between the components in CIS 100. In some embodiments, one or more file share storage (FSS) systems (not shown) can be utilized to provide file system level access to a CIS across a local area network (LAN).

Hardware resource manager 120 can be any suitable entity (e.g., software executed in a virtual machine) for managing aspects associated with physical infrastructure 118. In some embodiments, hardware resource manager 120 may be configured to provision hardware resources 122 via one or more communications interfaces. For example, hardware resource manager 120 may provision hardware resources 122 for implementing one or more virtual entities in virtualized infrastructure 108. In some embodiments, hardware resource manager 120 may comprise any management component or entity, such as a unified infrastructure manager (UIM) or a unified computing system (UCS) director entity, which is configured to provision the physical hardware of CIS 100.

In some embodiments, SVM 104 may include or utilize processor(s) 125, memory module(s) 124, and storage component(s) 132. For example, SVM 104 may be communicatively connected to various resources via a system bus. In some embodiments, processor(s) 125 can include a microprocessor (e.g., a trusted platform module (TPM) using trusted execution technology (TXT)), CPU, or any other like hardware based processing unit. In some embodiments, SVM 104 can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of SVM 104. In some embodiments, storage component(s) 132 can include any storage medium or storage unit that is configured to store data accessible by processor(s) 125 via a system bus. In some embodiments, repository 106 or portions thereof may utilize storage component(s) 132 and/or memory module(s) 124. In some embodiments, repository 106 and/or storage component(s) 132 can include or utilize one or more storage area networks.

As indicated above, the subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, SVM 104 and/or repository 106 (e.g., a system library or data therein) may be located at a single computing system or may be distributed across one or more devices, platforms, and/or systems. As used in the present disclosure, the terms "function" or "module" refer to hardware, firmware, or software in combination with hardware and/or firmware for implementing features described herein.

It will be appreciated that FIG. 1 is for illustrative purposes and that various components, their locations, and/or their functions as described above in relation to FIG. 1 may be changed, altered, added, or removed. Further, while SVM 104 is depicted as part of CIS 100 in FIG. 1, aspects of the present disclosure (e.g., SVM 104) may be implemented and/or located on any computing system.

Figure 2:
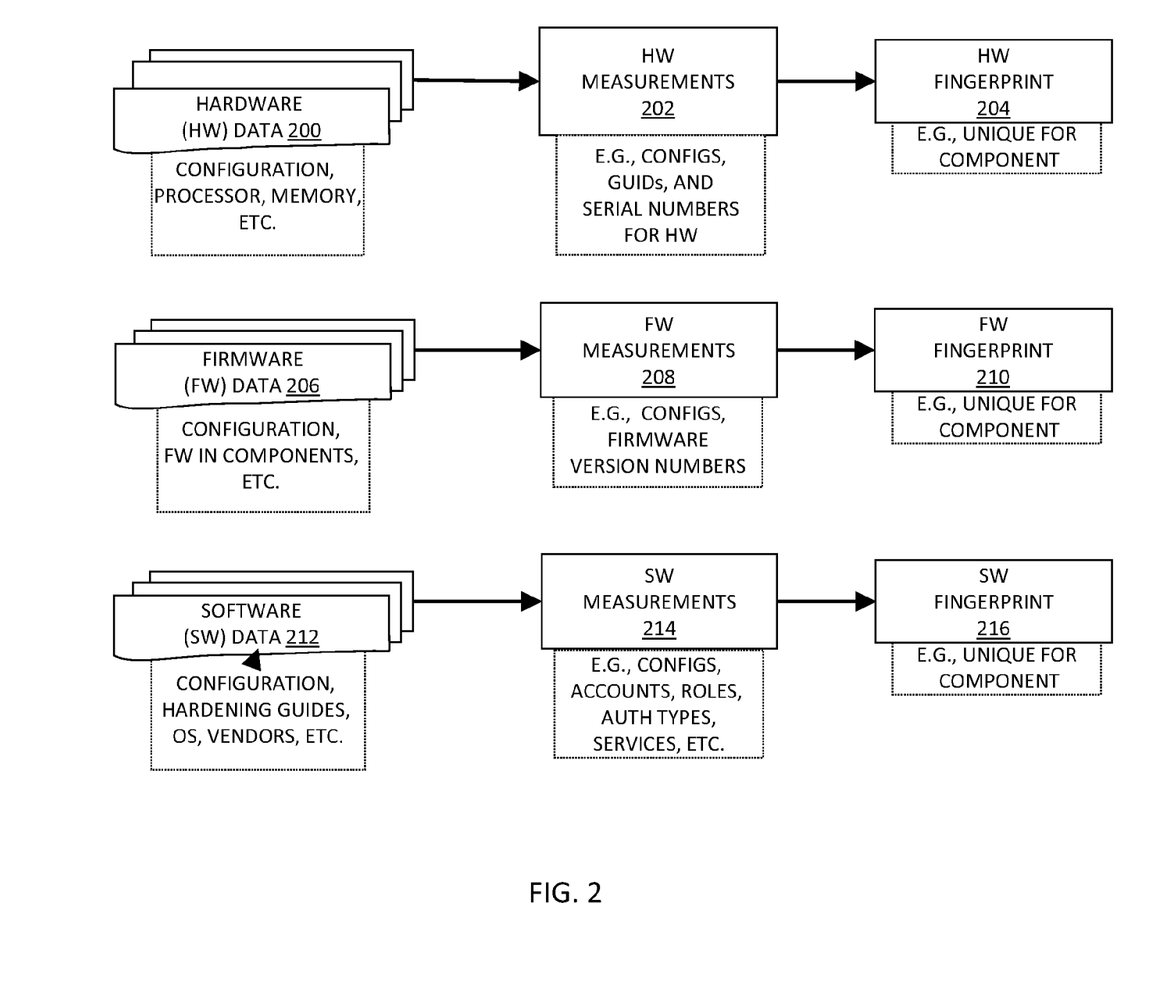
FIG. 2 is a diagram illustrating fingerprint generation according to an embodiment of the subject matter described herein.

FIG. 2 is a diagram illustrating fingerprint generation according to an embodiment of the subject matter described herein. In some embodiments, SVM 104 and/or a source entity may generate one or more fingerprints for validating a computing system (e.g., CIS 100) or portions therein. For example, a manufacturer of CIS 100 may use various measurements about hardware, software, and firmware to generate a fingerprint that can effectively identify CIS 100 or a portion therein.

Referring to FIG. 2, hardware data 200 may represent information, e.g., serial numbers, GUIDs, and/or configuration information, related to hardware components and modules, such as chassis, memory module(s) 124, processor(s) 125, network components 126-127, compute components 128-130, and/or storage component(s) 132. Hardware measurements 202 may represent measures, values, or other data for quantifying and/or measuring hardware data 200. Exemplary hardware measurements 202 may include hardware parameter values, GUIDs, and/or serial numbers for various hardware related entities. Hardware fingerprint 204 may represent an identifier (e.g., a 64-bit signature or a hash value) for identifying hardware related entities. For example, SVM 104 or a related entity may use a hashing algorithm and hardware measurements 202 for generating hardware fingerprint 204.

Firmware data 206 may represent information, e.g., firmware version numbers and/or configuration information, related to firmware components and firmware related modules, e.g., firmware in memory module(s) 124, processor(s) 125, network components 126-127, compute components 128-130, and/or storage component(s) 132. Firmware measurements 208 may represent measures, values, or other data for quantifying and/or measuring firmware data 206. Exemplary firmware measurements 208 may include firmware parameter values, GUIDs, firmware version numbers, hash firmware values, hash key firmware components, firmware signature values, and/or serial numbers for various firmware related entities. Firmware fingerprint 210 may represent an identifier (e.g., a 64-bit signature or a hash value) for identifying firmware related entities. For example, SVM 104 or a related entity may use a hashing algorithm and firmware measurements 208 for generating firmware fingerprint 210.

Software data 212 may represent information, e.g., software version numbers and/or configuration information, related to software and software related modules, e.g., software in memory module(s) 124, processor(s) 125, network components 126-127, compute components 128-130, and/or storage component(s) 132. Software measurements 214 may represent measures, values, or other data for quantifying and/or measuring software data 212. Exemplary software measurements 214 may include software parameter values, GUIDs, version numbers, and/or serial numbers for various software related entities. Software fingerprint 216 may represent an identifier (e.g., a 64-bit signature or a hash value) for identifying software related entities. For example, SVM 104 or a related entity may use a hashing algorithm and software measurements 214 for generating software fingerprint 216.

In some embodiments, hardware measurements 202, firmware measurements 208, and/or software measurements 214 may be based on, derived using, or gathered from configuration information, including information provided by client 160. For example, a customer or client 160 may complete a logical and/or physical configuration survey and/or identify configuration details from one or more security hardening guides. Exemplary configuration information usable for validation purposes can include accounts, roles, authentication methods, permissions, logging rules, administrative communications, running or active services, disabled services, and other information.

It will be appreciated that FIG. 2 is for illustrative purposes and that additional and/or different data and/or measurements may be used to generate one or more fingerprints depicted in FIG. 2. For example, a first CSC may be associated with a hardware fingerprint 204 that is based on additional and/or different hardware measurements 202 than hardware fingerprint 204 associated with a second CSC. In this example, each hardware fingerprint 204 can identify hardware associated with its respective CSC.

Figure 3:
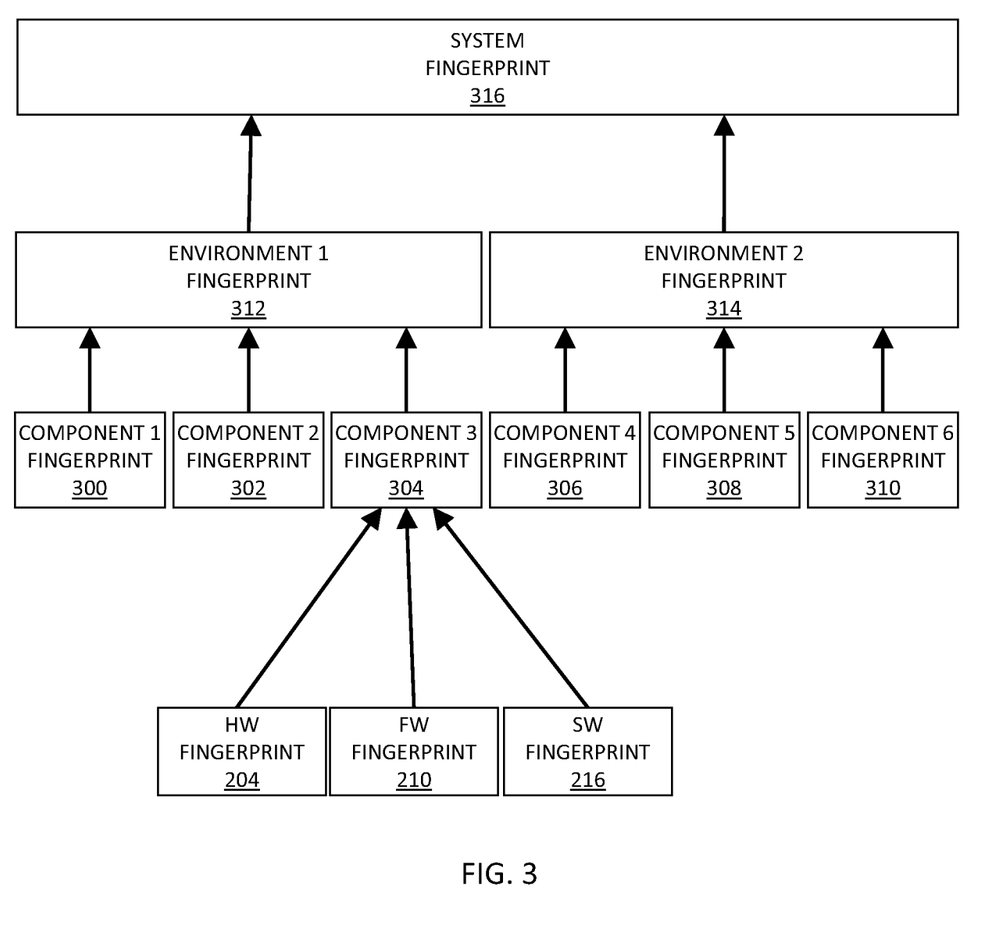
FIG. 3 is a diagram illustrating relationships between various fingerprints according to an embodiment of the subject matter described herein.

FIG. 3 is a diagram illustrating relationships between various fingerprints according to an embodiment of the subject matter described herein. In some embodiments, fingerprints may be generated using measurements and/or fingerprints associated with multiple entities. For example, a fingerprint associated with compute component 128 may include measurements and/or fingerprints for hardware, software, and/or firmware within compute component 128. In some embodiments, a fingerprint may be modular and, as such, may allow unique cross-section validation (e.g., validation of groups of CSCs or certain operating environments based on customer preferences).

Referring to FIG. 3, a "hierarchy" of fingerprints may be depicted. For example, certain types of fingerprints may be aggregate fingerprints associated with one or more component fingerprint. Component fingerprints 300-310 may represent fingerprints associated with CSCs. For example, component 3 fingerprint 304 may represent a fingerprint associated with network component 126. In this example, component 3 fingerprint 304 may be generated or based on hardware fingerprint 204, firmware fingerprint 210, and/or software fingerprint 216 associated with network component 126.

Environment fingerprints 312-314 may represent fingerprints associated with operating environments (e.g., groups of CSCs and/or other portions of a computing system). For example, environment 1 fingerprint 312 may represent a fingerprint associated with an environment containing compute component 128, storage components(s) 132, and network component 126. In this example, environment 1 fingerprint 312 may be generated or based on component 1 fingerprint 300, component 2 fingerprint 302, and/or component 3 fingerprint 304.

System fingerprint 316 may represent a fingerprint associated with a computing system. For example, system fingerprint 316 may represent a fingerprint associated with CIS 100, including all CSCs and/or environments therein. In this example, system fingerprint 316 may be generated or based on environment 1 fingerprint 312 and/or environment 2 fingerprint 314.

It will be appreciated that FIG. 3 is for illustrative purposes and that additional and/or different information may be used to generate one or more fingerprints depicted in FIG. 3. For example, system fingerprint 316 can be generated or based on hardware, software, and/or configuration measurements associated with CSCs or environments with CIS 100, along with fingerprints associated with these entities.

Figure 4:
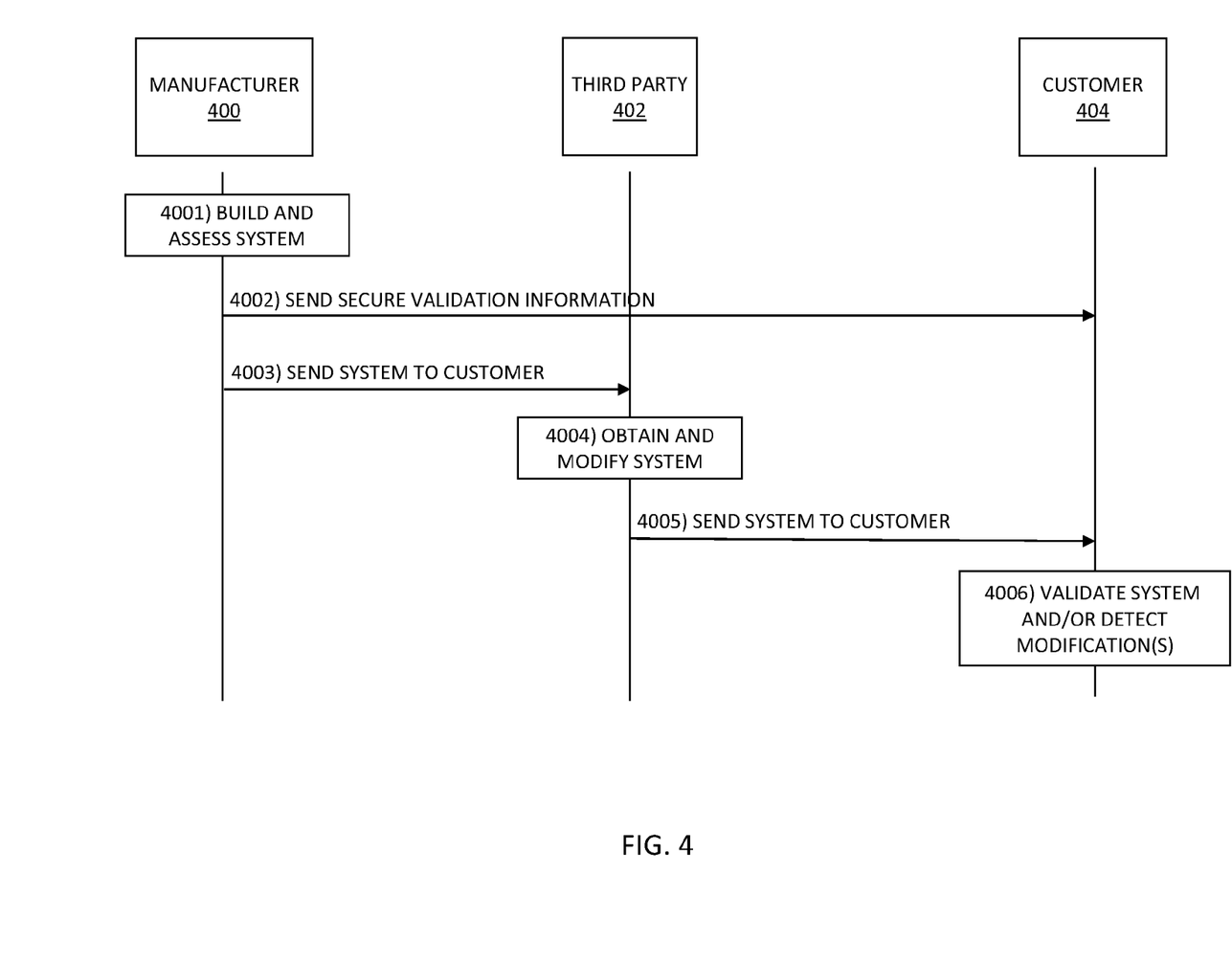
FIG. 4 is a diagram illustrating an exemplary supply chain validation according to an embodiment of the subject matter described herein.

FIG. 4 is a diagram illustrating an exemplary supply chain validation according to an embodiment of the subject matter described herein. In some embodiments, a source entity (e.g., a manufacturer 400) may generate or obtain validation information. In such embodiments, a recipient (e.g., a customer 404) may use the validation information to determine whether a supply chain has been compromised and/or whether a computing system has been modified by another entity (e.g., a third party 402).

Referring to FIG. 4, at step 4001, manufacturer 400 may build, configure, and/or assemble a computing system. For example, manufacturer 400 may use various CSCs in building and configuring CIS 100. Manufacturer 400 may also assess the computing system to generate validation information. For example, validation information may include known or expected values associated with the computing system and/or other state information.

At step 4002, validation information may be secured and sent to customer 404. For example, manufacturer 400 may store validation information in an encrypted data file and send the encrypted data file to customer 404 via a secure web-based portal, email, or another service or method.

In some embodiments, validation information may be exported using an XML data structure and may be uploaded to a customer portal. For example, validation information may be part of or associated with a cryptographically signed file and/or file hash value, which may prevent or hinder third party 402 from tampering with the validation information. In this example, the validation information may be usable for various purposes, e.g., customer support and/or validating that a computing system has not been modified.

In some embodiments, validation information may be sent out of band (e.g., separately and/or at different times from a related computing system). For example, validation information for a computing system may be sent as an XML file in an encrypted email, while the computing system may be delivered by a parcel delivery service.

At step 4003, manufacturer 400 may attempt to send the computing system to customer 404. For example, manufacturer 400 may hire a carrier to transport a computing system to customer 404. In this example, third party 402 may intercept the computing system without the knowledge or consent of customer 404.

At step 4004, the computing system may be obtained and modified by third party 402. For example, third party 402 may be entity (e.g., a foreign governmental agency, a malicious organization, or a competitor) that is unauthorized by customer 404 with regard to accessing or modifying a computing system. In this example, third party 402 may intercept the computing system via legal or illegal means and may modify the computing system, e.g., for gathering intelligence and/or for sabotage.

At step 4005, the computing system may be sent to customer 404. For example, after being modified by third party 402, third party 402 may send the computing system to customer 404.

In some embodiments, customer 404 may load received validation information in SVM 104 or another entity. For example, customer 404 may receive a secure data file and may decrypt and/or validate that the secure data file has not been compromised (e.g., modified to include fake or wrong information). In this example, after validating received validation information, customer 404 may use the validation information to determine whether system tampering or other modifications occurred.

At step 4006, customer 404 may use the validation information to validate the computing system and/or its related supply chain. For example, after receiving a computing system, customer 404 may use SVM 104 to generate reference information (e.g., state information or related information) associated with the computing system and may compare the reference information with received validation information from manufacturer 400.

In some embodiments, SVM 104 and/or another entity may generate or regenerate reference information and may time stamp this information to measure or detect differences in a computing system during various time periods. For example, after receiving a computing system, SVM 104 may be configured to automatically (re)calculate fingerprints and/or other measurements for every CSC in the computing system and compared this information against received validation information (e.g., known or expected state information from manufacturer 400).

In some embodiments, SVM 104 and/or another entity may use the validation information, along with reference information, to determine the integrity of the computing system and/or portions there, e.g., CSCs and/or groups of CSCs, such as a management infrastructure of CIS 100.

In some embodiments, SVM 104 and/or another entity may generate and/or provide information about a detected system modification. For example, SVM 104 may generate and display reference information alongside validation information provided by manufacturer 400. In this example, SVM 104 may utilize UI elements (e.g., graphics and colors) to emphasis differences between the data. In another example, UI elements may be utilized to request or select detailed information about one or more modifications, e.g., via an expandable tree list view.

In some embodiments, SVM 104 and/or another entity may be configured to display or provide some information and/or ignore some information about a system modification. For example, SVM 104 may be configured to ignore known drift or expected changes that typically occur upon receipt. In this example, the known changes may be ignored or de-emphasized such that unexpected or unknown changes are emphasized to the user.

It will be appreciated that FIG. 4 is for illustrative purposes and that additional and/or different steps than those depicted in FIG. 4 may be used to validate a supply chain and/or a computing system. Additionally, it will be appreciated that steps depicted in FIG. 4 may occur in a different order than depicted. For example, steps 4003 may occur prior to or concurrently with step 4002.

Figure 5:
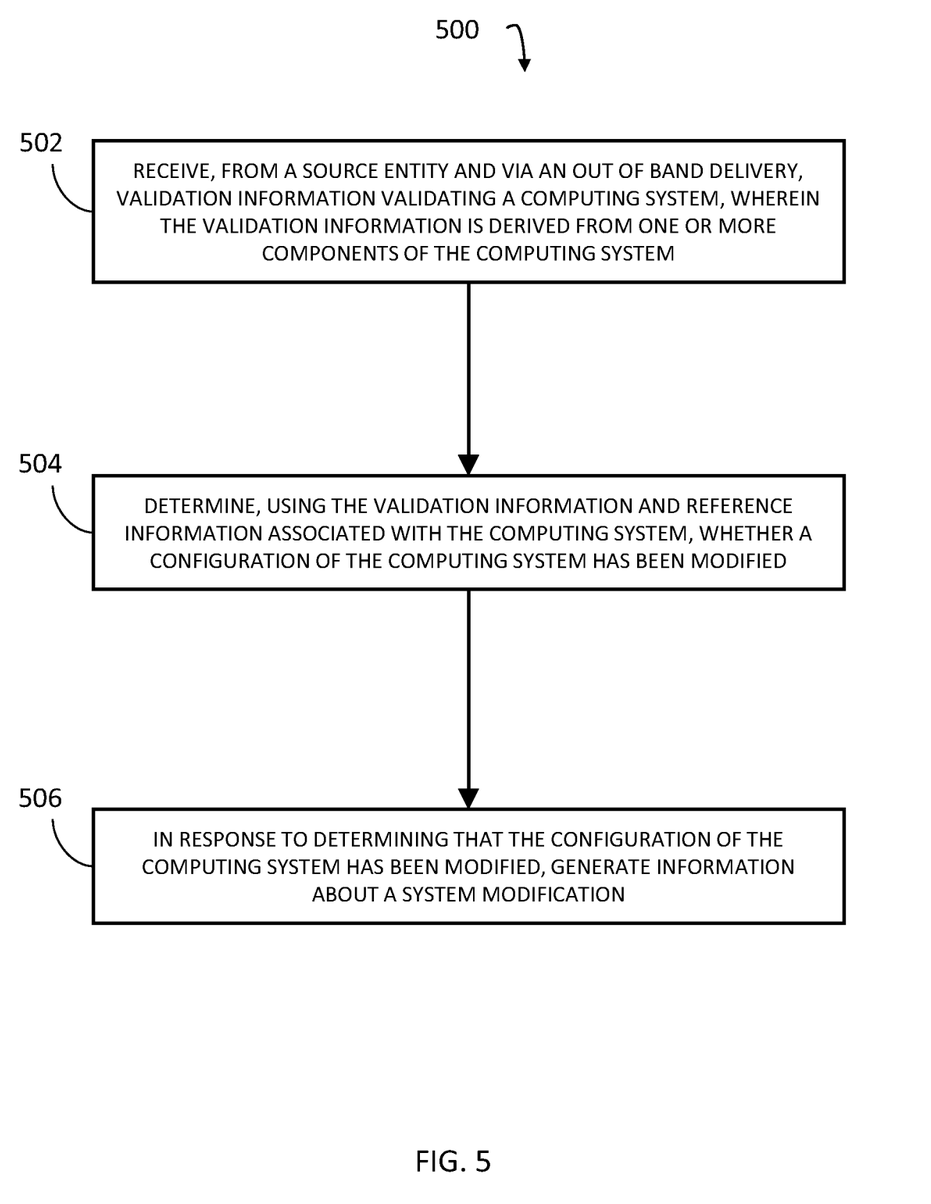
FIG. 5 is a diagram illustrating an exemplary method for validating a computing system according to an embodiment of the subject matter described herein.

FIG. 5 is a diagram illustrating an exemplary method 500 for validating a computing system according to an embodiment of the subject matter described herein. In some embodiments, exemplary steps 502, 504, and/or 506 associated with exemplary method 500 may be performed by CIS 100, CIS manager 102, SVM 104, and/or another node or module. For illustrative purposes and explanation, references to entities included in FIGS. 1-4 may be used below.

At step 502, validation information for validating a computing system is received. The validation information may be from a source entity and received via an out of band delivery. In some embodiments, the validation information may be derived (e.g., received, obtained, and/or based on information) from one or more components (e.g., CSCs) of the computing system (e.g., CIS 100).

In some embodiments, a source entity (e.g., an entity that provides a computing system and related validation information) can include a seller or a manufacturer of a computing system. For example, a source entity may include a seller or a manufacturer of CIS 100.

In some embodiments, an out of band delivery involving validation information can be separate from a delivery of a computing system. For example, prior to delivering a computing system (e.g., CIS 100) to a customer, the manufacturer may generate validation information (e.g., a system fingerprint) associated with the computing system and store the validation information in a secure (e.g., encrypted or signed) XML file. In this example, the manufacturer may provide the secure XML file to the customer via a digital delivery (e.g., via the Internet, social media, an email, or a text message) or a physical delivery (e.g., via a printout, a CD-ROM, a flash drive, or a hard drive).

In some embodiments, validation information may be received via at least one member selected from a group consisting of an application programming interface (API) related message, a representational state transfer (REST) API related message, an XML related message, a file transfer protocol (FTP) message, a secure FTP (SFTP) message, an hypertext transfer protocol (HTTP) message, and some other technique.

In some embodiments, validation information can be encrypted by the source entity, e.g., prior to being sent to SVM 104. For example, validation information may be stored in a file that is encrypted using advanced encryption standard (AES) with a key length of 256 bits (AES-256) or another encryption standard and/or key length (e.g., AES-128, AES-512, Twofish-256, or pretty good privacy (PGP)).

In some embodiments, validation information can include at least one member selected from a group consisting of a software measurement, a hardware measurement, a firmware measurement, a serial number, a GUID, a version number, configuration information, and a fingerprint created, obtained or derived from one or more of the components of the CIS 100.

At step 504, it is determined, using the validation information and reference information associated with the computing system, whether a configuration of the computing system has been modified. For example, when CIS 100 is delivered to a customer, SVM 104 may be configured to identify or determine reference information (e.g., measurements and/or fingerprints representing current state information) associated with CIS 100. In this example, SVM 104 may use the reference information and the validation information to determine whether any unexpected or unwanted differences are detected.

In some embodiments, a configuration of a computing system can include hardware, firmware, and/or software. For example, a computing system may have a known configuration that includes particular CSCs, such as memory module(s) 124, processor(s) 125, network components 126-127, compute components 128-130, and/or storage component(s) 132. In this example, any modification of one or more of these CSCs may indicate system tampering or modification.

In some embodiments, determining whether the computing system has been modified can include determining the reference information associated with the computing system (e.g., by identifying and/or generating related fingerprints) and comparing the reference information and the validation information.

At step 506, in response to determining that the configuration of the computing system has been modified, information about a system modification is generated. For example, SVM 104 may generate relevant information about a system modification (e.g., reversion instructions and/or identities of potential responsible parties) and may inform a user (e.g., via a GUI or other user interface) that the computing system has been modified. In this example, SVM 104 may indicate detected discrepancies between validation information provided by a manufacturer and reference information generated at reception.

In some embodiments, an exemplary user interface for providing information about a system modification may include UI elements that allow a user to "drill down" and/or receive details about a system modification, including general advice and/or potential mitigation actions to perform, e.g., actions for automatically reverting the detected system modification or for quarantining a compromised component or system portion.

In some embodiments, a computing system to be validated can include at least one member selected from a group consisting of a CIS, a computing platform, a computing device, multiple computing platforms, multiple computing devices, a backend computing system, a network-connected computing system, and a computing system comprising components from various manufacturers.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for validating a computing system, the method comprising:

receiving, by a system validation module from a source entity and via an out of band delivery, validation information for validating a computing system, wherein the validation information is derived from two or more components of the computing system based on user-identified configuration information, wherein the two or more components include a first application and a first hardware component, wherein the user-identified configuration information indicates that a software measurement for the first application and a hardware measurement for the first hardware component is to be used in deriving the validation information, and wherein the system validation module utilizes at least one physical processor and a memory;

determining, by the system validation module using the validation information and reference information associated with the computing system, whether a configuration of the computing system has been modified, wherein determining whether the configuration of the computing system has been modified includes determining the reference information associated with the computing system and comparing the reference information and the validation information; and in response to determining that the configuration of the computing system has been modified, generating, by the system validation module, information about a system modification.

2. The method of claim 1 wherein the validation information is encrypted by the source entity.

3. The method of claim 1 wherein the configuration includes at least one member selected from a group consisting of hardware, software, and firmware.

4. The method of claim 1 wherein the validation information includes at least one member selected from a group consisting of a software measurement, a hardware measurement, a firmware measurement, a serial number, a globally unique identifier (GUID), a version number, configuration information, and a fingerprint.

5. The method of claim 1 wherein the computing system includes at least one member selected from a group consisting of a converged infrastructure system (CIS), a computing platform, a computing device, multiple computing platforms, multiple computing devices, a backend computing system, a network-connected computing system, and a computing system comprising components from various manufacturers.

6. A system for validating a computing system, the system comprising:

at least one physical processor;

memory; and a system validation module utilizing the at least one physical processor and the memory, wherein the system validation module is configured to receive, from a source entity and via an out of band delivery, validation information for validating a computing system, wherein the validation information is derived from two or more components of the computing system based on user-identified configuration information, wherein the two or more components include a first application and a first hardware component, wherein the user-identified configuration information indicates that a software measurement for the first application and a hardware measurement for the first hardware component is to be used in deriving the validation information, to determine, using the validation information and reference information associated with the computing system, whether a configuration of the computing system has been modified, and, in response to determining that the configuration of the computing system has been modified, to generate information about a system modification, wherein the system validation module is configured to determine whether the configuration of the computing system has been modified by determining the reference information associated with the computing system and comparing the reference information and the validation information.

7. The system of claim 6 wherein the validation information is encrypted by the source entity.

8. The system of claim 6 wherein the configuration includes at least one member selected from a group consisting of hardware, software, and firmware.

9. The system of claim 6 wherein the validation information includes at least one member selected from a group consisting of a software measurement, a hardware measurement, a firmware measurement, a serial number, a globally unique identifier (GUID), a version number, configuration information, and a fingerprint.

10. The system of claim 6 wherein the computing system includes at least one member selected from a group consisting of a converged infrastructure system (CIS), a computing platform, a computing device, multiple computing platforms, multiple computing devices, a backend computing system, a network-connected computing system, and a computing system comprising components from various manufacturers.

11. A non-transitory computer readable medium having stored thereon executable instructions which, when executed by a processor of a computer, cause the computer to perform steps comprising:

receiving, from a source entity and via an out of band delivery, validation information for validating a computing system, wherein the validation information is derived from two or more components of the computing system based on user-identified configuration information, wherein the two or more components include a first application and a first hardware component, wherein the user-identified configuration information indicates that a software measurement for the first application and a hardware measurement for the first hardware component is to be used in deriving the validation information;

determining, using the validation information and reference information associated with the computing system, whether a configuration of the computing system has been modified, wherein determining whether the configuration of the computing system has been modified includes determining the reference information associated with the computing system and comparing the reference information and the validation information; and in response to determining that the configuration of the computing system has been modified, generating information about a system modification.

12. The non-transitory computer readable medium of claim 11 wherein the validation information is encrypted by the source entity and the out of band delivery occurs separately from a delivery of the computing system.

13. The non-transitory computer readable medium of claim 11 wherein the configuration includes at least one member selected from a group consisting of hardware, software, and firmware.

14. The non-transitory computer readable medium of claim 11 wherein the validation information includes at least one member selected from a group consisting of a software measurement, a hardware measurement, a firmware measurement, a serial number, a globally unique identifier (GUID), a version number, configuration information, and a fingerprint.

15. The non-transitory computer readable medium of claim 11 wherein the computing system includes at least one member selected from a group consisting of a converged infrastructure system (CIS), a computing platform, a computing device, multiple computing platforms, multiple computing devices, a backend computing system, a network-connected computing system, and a computing system comprising components from various manufacturers.

* * * * *